United States Patent [19]

Meltz et al.

[11] Patent Number: 4,577,100

[45] Date of Patent: Mar. 18, 1986

[54] TEMPERATURE COMPENSATED OPTICAL PRESSURE SENSOR

[75] Inventors: Gerald Meltz, Avon, Conn.; Louis B. Allen, Jr., Binghamton, N.Y.; Carl M. Ferrar, East Hartford, Conn.

[73] Assignee: United Technologies Corporation, Hartford, Conn.

[21] Appl. No.: 565,496

[22] Filed: Dec. 27, 1983

[51] Int. Cl.$^4$ .................................................. G01L 1/24
[52] U.S. Cl. ................................ 250/231 P; 73/800; 73/862.38; 350/96.29
[58] Field of Search ............... 250/227, 231 R, 231 P; 73/655, 765, 766, 705, 763, 800, 862.38, 862.64; 350/96.15, 96.29; 356/32-34, 35.5

[56] References Cited

U.S. PATENT DOCUMENTS

| | | | |
|---|---|---|---|
| 3,517,560 | 6/1970 | Jacobs et al. ........................ | 73/516 |
| 3,743,962 | 7/1973 | Rosenberg . | |
| 3,786,681 | 1/1974 | Kiehn ................................... | 73/382 |
| 3,949,320 | 4/1976 | Castleberry et al. . | |
| 4,295,738 | 10/1981 | Meltz et al. ........................ | 356/32 |
| 4,466,295 | 8/1984 | Wesson ............................... | 73/800 |
| 4,519,252 | 5/1985 | McMahon ..................... | 250/231 R |

FOREIGN PATENT DOCUMENTS

WO83/02168  6/1983  PCT Int'l Appl. .............. 350/96.15

OTHER PUBLICATIONS

Clifford G. Walker, "Photoelastic and Electro-Optic Sensors", published in vol. 412, Fiber Optic and Laser Sensors, Proceedings of SPIE, (1983).

Primary Examiner—Edward P. Westin
Attorney, Agent, or Firm—Robert P. Sabath; Richard P. Lange

[57] ABSTRACT

An integrated optical pressure transducer having a diaphragm fabricated from a low-loss glass is positioned at the location where pressure changes are to be measured. An optical waveguide loop formed on one surface of the diaphragm acts as a ring cavity in which the difference between the resonating frequencies varies with pressure but not with temperature. Light energy is coupled into the waveguide loop from an optical source through a tangentially located input waveguide. An output waveguide, also tangentially located, couples light energy from the waveguide loop to a broadband detector so that the changes in frequency spectrum of the resonating frequencies within the waveguide loop can be monitored.

10 Claims, 4 Drawing Figures

TEMPERATURE COMPENSATED OPTICAL PRESSURE SENSOR

DESCRIPTION

1. Technical Field

This invention relates generally to an optical system for measuring pressure, and more particularly, to a pressure transducer fabricated from a glass material having a diaphragm that experiences stress-induced birefringence, causing a shift in the resonant frequencies within a waveguide loop.

2. Background Art

Pressure transducers are devices which are used to monitor changes in pressure. A pressure transducer is an integral part of a pressure measuring system and is positioned at a location of interest. The pressure transducer is monitored, or interrogated, with an electrical, pneumatic, hydraulic or optical signal which communicates the pressure variations at the transducer location. With the dramatic increase in the use of optical waveguides, optical sensors of all types have been proposed. For example, a multiple core pressure responsive optical fiber waveguide is disclosed in U.S. Pat. No. 4,295,738 issued Oct. 20, 1981 to G. Meltz et al (commonly assigned) for "Fiber Optic Strain Sensor". Strain changes acting on the optical waveguide are determined by measuring the relative intensity of light emerging from the cores.

Of particular interest is an article on "Photoelastic and Electro-Optic Sensors" by Clifford G. Walker, published in Vol. 412, Fiber Optic and Laser Sensors, Proceedings of SPIE (1983), describing a passive laser accelerometer. FIG. 1 shows a ring resonator in a laser accelerometer including a laser source of very narrow line-width whose output beam is split into two separate beams and passed through separate Bragg cells. A polarizer rotates one beam by 90° and the beams are then presented to a ring resonator. The stress acting on the ring resonator can be measured by tracking the frequency difference. However, it should be noted that the optic sensor suggested by the C. Walker article does not suggest the wideband noncoherent source of optical energy for measuring the change in stress-induced birefringence associated with the deformation under pressure of a diaphragm formed from a high quality optical material.

DISCLOSURE OF INVENTION

It is an object of the present invention to provide a pressure measuring system having a pressure transducer fabricated from optical materials to provide an accurate and repeatable pressure measurement over a wide temperature range in harsh environments, such as corrosive gases and liquids.

A particular feature of the optical pressure sensor according to the present invention is the pressure transducer that includes a centrally disposed diaphragm rigidly held at its perimeter by an integrally formed rim. Deformation of the diaphragm by pressure acting on one face causes stress-induced birefringence in a waveguide loop and hence a corresponding change in the resonating frequencies induced by the optical energy from a light source of relatively broad linewidth such as a super radiant diode.

Another aspect of the optical pressure sensor according to the present invention is that a pressure transducer fabricated from rugged and durable low-loss glass is used to measure pressure changes. A waveguide loop on one face of a diaphragm experiences stress-induced birefringence which causes a relative phase difference in the components of the light energy propagating in the closed loop. An output signal proportional to this phase difference is formed by coupling a small portion of the resonating optical energy to an output waveguide and optical detector which analyzes the spectral content of the optical energy.

The foregoing and other objects, features and advantages of the present invention will become more apparent from the following description of preferred embodiments and accompanying drawing.

BEST MODE FOR CARRYING OUT THE INVENTION

Figure 1:
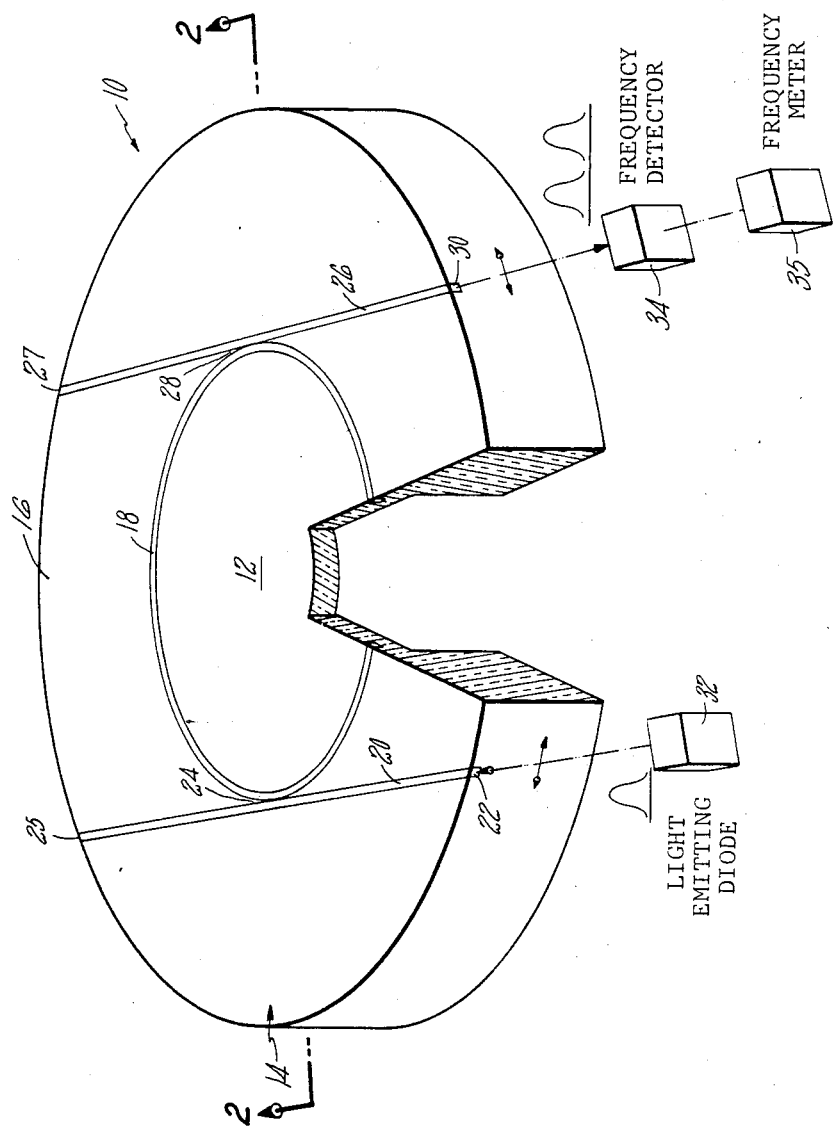
FIG. 1 is an enlarged, perspective view depicting the basic components of an optical pressure measuring system according to the present invention, showing the pressure transducer, with a segment cutaway, having a waveguide loop and input and output waveguides on one end face.

Referring initially to FIG. 1, there is seen a drawing depicting in simplified form the major components of the optical pressure sensor according to the present invention. A pressure transducer 10 is positioned at the location where the changes in fluid pressure are to be measured. At the central portion of the transducer 10 a diaphragm 12 is integrally formed with a rim 14, the rim 14 extending circumferentially around the perimeter of the pressure transducer 10. One end face 16 (the upper face as shown in FIG. 1) includes a waveguide loop 18 formed on an end surface of the diaphragm 12. An input waveguide 20 is also formed on the end surface 16 of the pressure transducer 10 and, in the preferred embodiment extends from a point 22 on the perimeter of the rim 14 in a chordal direction through an energy transfer point 24 tangentially located to the waveguide loop 18 to a point 25 on the opposite side of the transducer. Also located on the end surface 16 is an output waveguide 26 which extends from a point 27 in a chordal direction through an energy transfer point 28 that is tangentially located with respect to the waveguide loop 18 to a point 30 at the perimeter of the rim 14.

The optical pressure sensor of the present invention also includes an optical source 32, such as a super radiant diode or other semibroadband, spectrally bright optical source, that is located to couple optical energy through the end 22 of the input waveguide 20. A frequency detector 34 is also provided and is positioned to monitor light energy emerging from the end face 30. As will be explained in greater detail hereinafter, the frequency detector 34 is a device which analyzes the spectral content of the light energy resonating in the waveguide loop 18. If desired, the optical source 32 and the frequency detector 34 can be remotely located and optical energy can be conducted to, and from, the pressure transducer 10 by optical waveguides (not shown). This is particularly desirable if the pressure changes are to be measured in a harsh environment—e.g., subject to high temperature or corrosive fluids.

Figure 2:
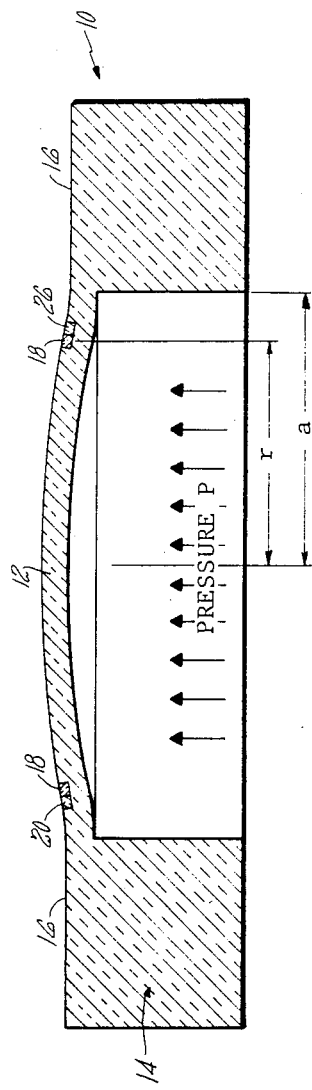
FIG. 2 is a cross-sectional view of only the pressure transducer depicted in FIG. 1, showing the diaphragm, somewhat exaggerated, deflected under pressure.
Figure 3:
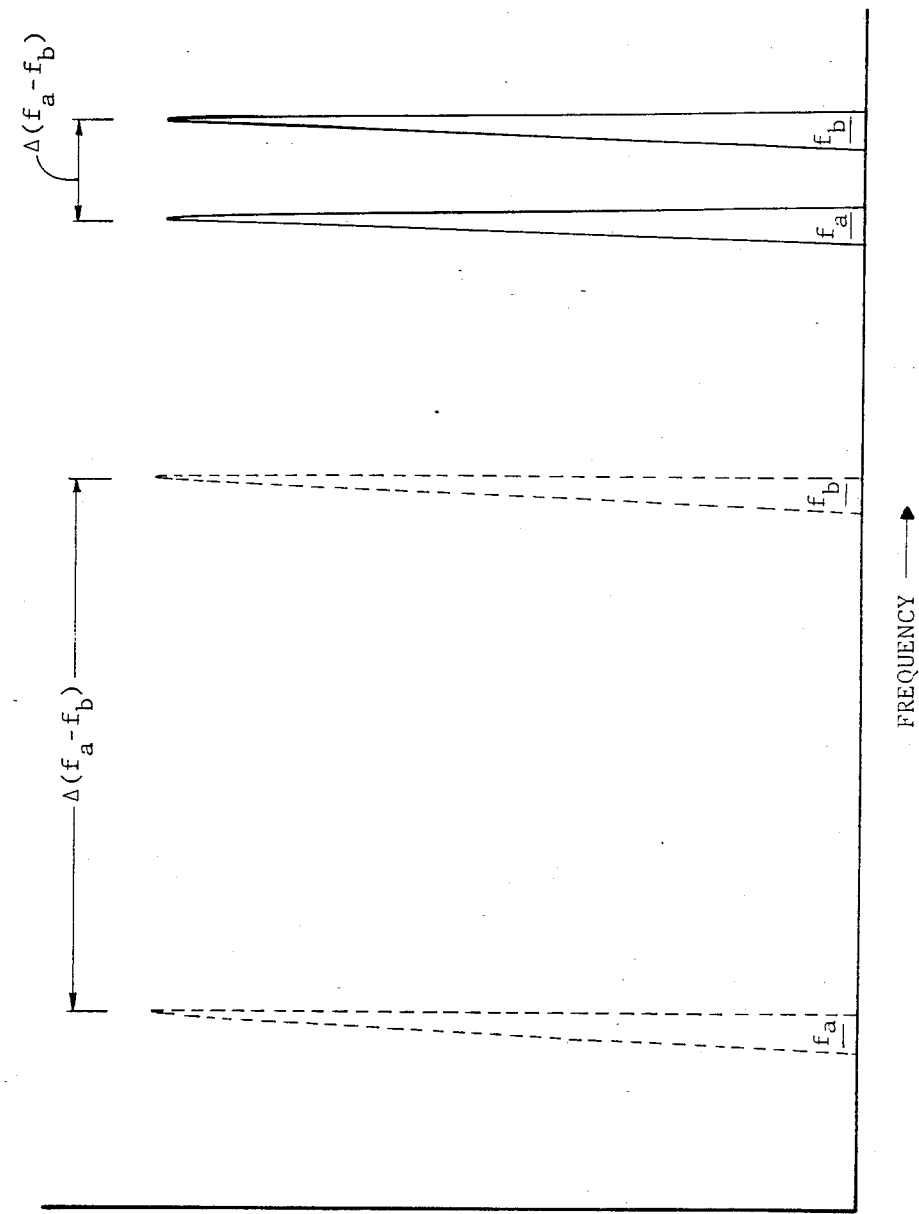
FIG. 3 is a graph depicting the differential frequency shift of the optical energy resonating in the waveguide loop located on the end face of the pressure transducer.

As will be appreciated, a particularly important aspect of the optical pressure sensor according to the present invention relates to the manner in which the pressure transducer 10 responds to pressure changes so that these changes can be accurately monitored by the frequency detector 34. Referring additionally to FIG. 2, the pressure transducer 10 is seen in cross section, with the deflection of the diaphragm 12 exaggerated for purposes of clarity. The pressure transducer 10 is preferably formed from an optically transparent material suitable for the formation of low-loss optical waveguides. In preferred form, the rim 14 has a much greater thickness than the diaphragm 12 such that the perimeter of the diaphragm is rigidly fixed around its circumference. While the rim 14 and diaphragm 12 could be fabricated as separate components, the manufacturing process for an integrated structure would be less costly and involve fewer steps.

It will be appreciated by those of ordinary skill that an important aspect of the present invention is the waveguide loop 18 which acts as an optical resonator, and that the resonating frequencies in that optical resonator vary as a function of pressure acting on the pressure transducer 10. At this point it may be helpful to describe the theory and operation of an optical pressure sensor according to the present invention. Still referring to FIGS. 1 and 2, as mentioned the waveguide loop is formed, for example, as a low-loss, single mode rectangular waveguide by one of the well-known prior art methods, such as ion implantation. Each resonant frequency supported in the waveguide loop 18 will be split into two closely spaced frequencies corresponding to the lowest order waveguide modes that are polarized perpendicular and parallel to the broad dimension of the guide. The separation between these frequencies will vary with pressure because of stress-induced birefringence. It will be appreciated by those of ordinary skill that the resonant loop is acting in a manner similar to an optical comb filter with a sequence of pass bands centered on the resonant frequencies, as follows:

$$f_{a,b} = N\, c/(n_{a,b} L), \quad N = 1, 2, \ldots \tag{1}$$

$n_a$ and $n_b$ are the phase refractive indices of the perpendicular and parallel modes, respectively, L is the circumference of the ring and N is the resonance order. A symmetric, uniformly distributed load on the diaphragm will stress the loop and thereby shift the pass bands. The change in resonant frequencies $\delta f_a$ and $\delta f_b$ will be determined by both the radial strain $\epsilon_r$ and tangential strain $\epsilon_\theta$. There are two contributions to the change in optical path length—one due to the change in the perimeter of the ring and one due to the stress-induced birefringence:

$$\delta f_a/f = -(\epsilon_\theta + \delta n_a/n) \tag{2}$$

$$\delta f_b/f = -(\epsilon_\theta + \delta n_b/n) \tag{3}$$

where $$f = f_a \approx f_b$$

$$n = n_a \approx n_b$$

The change in index of refraction is related to the perpendicular $p_a$ and parallel $p_b$ photoelastic constants of the waveguide loop by:

$$\delta n_a/n = (-n^2/2)\cdot p_a(\epsilon_r + \epsilon_\theta) \tag{4}$$

$$\delta n_b/n = (-n^2/2)\cdot (p_b \epsilon_r + p_a \epsilon_\theta) \tag{5}$$

Simple plate theory shows that the surface strains in the diaphragm 12 are given by:

$$\epsilon_\theta = \frac{P a^2 t}{32 D}[1 - (r/a)^2] \tag{6}$$

$$\epsilon_r = \frac{P a^2 t}{32 D}[1 - 3(r/a)^2] \tag{7}$$

where $$D = \frac{E t^3}{12(1 - \nu^2)} = \text{flexural rigidity},$$

t = diaphragm thickness,
E = Young's modulus,
$\nu$ = Poisson's ratio.

The photoelastic constants for fused silica in the waveguide loop 18 are:
$p_b = 0.126$
$p_a = 0.27$
Using these values and substituting the equations (6) and (7) for the strains into (2) and (3) one can obtain an estimate of the frequency shift of each mode and of their resultant difference frequency $\Delta$:

$$\delta f_a/f = -C\cdot[0.426 + 0.148(r/a)^2] \tag{8}$$

$$\delta f_b/f = -C\cdot[0.579 - 0.311(r/a)^2] \tag{9}$$

$$\Delta/f = C\cdot[0.153 - 0.459(r/a)^2] \tag{10}$$

where $$C = (1/E)(3/8)(1 - \nu^2) P (a/t)^2 = \frac{P a^2 t}{32 D} \tag{11}$$

Figure 4:
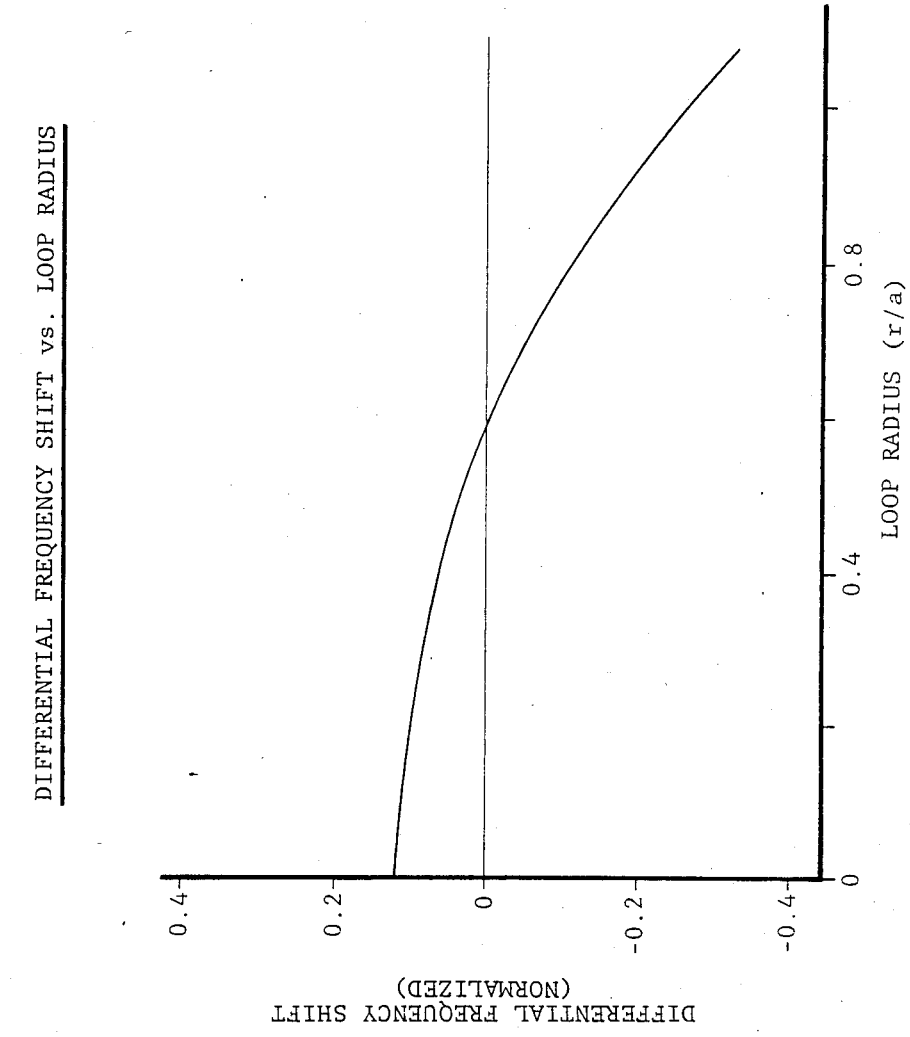
FIG. 4 is a graph showing the differences between the normalized resonant frequency shifts versus the radius of the loop on the diaphragm of the pressure transducer.

The normalized frequency shift $\Delta/(fC)$ is plotted as a function of $(r/a)$ in the graph of FIG. 4. The location of the waveguide loop 18 and the thickness ratio $(r/a)$ should be chosen so that the differential frequency shift $\Delta$ does not exceed half the free spectral range $\Delta f_r$ between mode orders of the comb filter yet be sufficiently large to provide an adequate signal to noise ratio. For example, if $$E = 10.4 \times 10^6 \text{ psi}, \nu = 0.17, a/t = 4$$

then $$C = 5.6 \times 10^{-7} P$$

and $$\Delta f_r = c/(n 2\pi r) = 3.3 \times 10^9 (r/1 \text{ cm})^{-1} \text{ Hz} \tag{12}$$

$$f = c/\lambda \approx 3 \times 10^{14} \text{ Hz} \tag{13}$$

then $$\Delta/\Delta f_r = 7.8 \times 10^{-3} (a/1 \text{ cm})(r/a)(P/1 \text{ psi})[1 - 3(r/a)^2] \quad (14)$$

If $a=0.5$ cm and $P=100$ psi, then the requirement $|\Delta| < \Delta f_r/2$ can be satisfied by locating the waveguide loop 18 at $r/a < 0.9$. For the largest signal-to-noise ratio $r/a$ should be set near the maximum allowable limit. For $a=\frac{1}{2}$ cm and $r/a=0.85$, the free spectral range is 8.19 GHz and the maximum differential frequency shift for 100 psi pressure is $-3.0$ GHz.

The width of a single line $\delta f'$ is determined by the "finesse" of the resonator which is defined by $$F = \Delta f_r / \delta f' \quad (15)$$

If K is the power-coupling efficiency of the input and output couplers, l is the coupling loss and $\gamma$ is the waveguide attenuation (in decibels per unit length), then $$F = \frac{\pi(1 - K - l)^{\frac{1}{2}} \exp(-\pi r \gamma/8.68)}{1 - (1 - K - l) \exp(-2\pi r \gamma/8.68)} \quad (16)$$

and the peak transmission at the center of a pass band is $$T = \frac{K^2 \exp(-2\pi r \gamma/8.68)}{[1 - (1 - K - l) \exp(-2\pi r \gamma/8.68)]^2} \quad (17)$$

If the attenuation in the ring resonator 18 is 0.01 dB/cm and the power-coupling efficiency and input-/output coupling losses are 1%, while $r=0.4$ cm, $K=1\%$, $l=1\%$ then $F=136$ and $T=0.19$. The width of each pass band for these parameters is about 60 MHz. The zero-pressure separation between lines is a function of the dimensions and numerical aperture of the embedded waveguide. It can be made at least an order of magnitude greater than the line width. For example, if the numerical aperture is 0.1 and the waveguide has a 2:1 aspect ratio, then $f_a - f_b \simeq 500$ MHz. The optical source 32 and the frequency detector 34 should be sufficiently broadband to encompass at least the maximum anticipated total separation between bands; i.e., the zero-pressure separation plus the pressure dependent component $\Delta$.

The waveguide loop 18 selects from the broadband input, and presents to the detector 34, the resonance lines described above. Many pairs of such lines may arise from a very broadband source, with each pair exhibiting substantially the frequency separation indicated above. The detector 34 may be a photodiode which mixes the incident optical lines, yielding an electrical output signal containing this separation frequency. If desired, an electronic spectrum analyzer, or a frequency meter 35 appropriately filtered to remove frequency components outside the range of interest, can then directly measure the separation frequency, which is proportional to the pressure as described above.

A particularly important aspect of the present invention is that pressure measurements by the pressure transducer 10 are essentially independent of temperature variations. It should be understood that although thermal expansion may significantly change the perimeter of the waveguide loop 18, this change acts equally on the two polarizations such that both of the resonant frequencies supported in the waveguide loop 18 are shifted by essentially the same amount. This means that any differential frequency shift is unrelated to the change in temperature and is still primarily proportional to the change in applied pressure. It is recognized that Young's modulus for the material of the pressure transducer 10 is known to be a weak function of temperature; but, so long as the temperature range of operation for the pressure transducer 10 is not unreasonably large, an acceptable accuracy can still be maintained.

Various methods are known for the fabrication of the diaphragm 12 according to the present invention. As mentioned hereinbefore, the substrate may be formed from a low-loss alkali silicate glass such as sodium silicate. The resonator ring 18 and the input waveguide 20 and the output waveguide 26 can be formed by ion exchange techniques, using photoresist masking of the exchange side of the diaphragm 12, except for the exchange window. The mask material should be impermeable to the exchange cation and withstand the exchange temperature; typical mask materials include aluminum and nickel. The masked diaphragm 12 is immersed in a molten electrolyte containing the desired cation. The ion exchange is carried out by applying an appropriate potential across two electrodes immersed in the molten electrolyte containing the diaphragm. After exchange the mask can be dissolved in an acid.

Although the optical pressure sensor of the present invention has been shown and described with respect to a preferred embodiment, it will be understood by those of ordinary skill in this art that various changes in the form and detail of the invention may be made without departing from the spirit and scope of the claimed invention. For example, the waveguide loop 18 on the end face of the pressure transducer 10 was generally depicted as being coaxially located on the diaphragm 12. In fact, the waveguide loop 18 could be located at any position on the end face of the pressure transducer so long as sufficient stress-induced birefringence occurs in the waveguide loop 18 to obtain a measurable shift in the resonant frequencies. The cross section of the waveguide loop 18 need not be generally rectangular as shown (FIG. 2) but could be of any cross-sectional shape so long as there is a different resonant frequency for each independent polarization of optical energy in the waveguide. The loop could in fact be formed from a polarization pressuring optical fiber which could be bonded to the surface of the diaphragm. Furthermore, input and output optical energy need not be through chordal-like input and output waveguides 20 and 26 on the end face 16 of the pressure transducer 10, in that optical energy could be coupled into and out of the waveguide loop 18 through other means such as prisms closely positioned adjacent the top of the waveguide.

We claim:

1. A pressure monitor, comprising:
   pressure responsive means including a diaphragm having a waveguide loop located on one surface thereof, said diaphragm deflecting under pressure to cause stress-induced birefringence in said waveguide loop;
   optical input means positioned adjacent said waveguide loop for coupling light energy into said waveguide loop;
   output means also positioned adjacent said waveguide loop for coupling a portion of light energy out of said waveguide loop; and
   whereby a differential frequency shift occurs in the spectral response of light energy resonating in said waveguide loop as a result of said stress-induced birefringence which is proportional to pressure acting on said diaphragm.

2. A pressure monitor according to claim 1, wherein said input means includes an input waveguide formed along said one surface of said pressure responsive means, and wherein said input waveguide has a point which is tangentially located with said waveguide loop through which optical energy is coupled into said waveguide loop.

3. A pressure monitor according to claim 1, further including a super radiant diode for providing a noncoherent, wideband source of optical energy which cooperates with said input means.

4. A pressure monitor according to claim 1, wherein said output means further includes an output waveguide formed along said one surface of said pressure responsive means, and includes a point tangentially located with respect to said waveguide loop through which a portion of optical energy therein is coupled out of said waveguide loop.

5. A pressure monitor according to claim 4, further including a frequency detector positioned to receive light energy coupled out of said waveguide loop through said output waveguide, and wherein said frequency detector analyzes the spectral distribution of said received optical energy to identify a difference frequency associated with said differential frequency shift.

6. A pressure monitor according to claim 1, wherein said pressure responsive means includes a rigid rim portion which rigidly holds the circumference of said diaphragm.

7. A pressure monitor according to claim 6, wherein said rim and said diaphragm are integrally formed from a low-loss glass.

8. A pressure monitor according to claim 7, wherein said waveguide loop formed on the end surface of said pressure responsive means is formed by ion implantation or ion exchange.

9. A temperature compensated pressure measuring system, comprising:

pressure responsive means including a diaphragm having a waveguide loop located on one surface thereof, said diaphragm causing a stress-induced birefringence in said waveguide loop in response to pressure acting on a surface thereof;

source means positioned to couple optical energy into said waveguide loop;

frequency detector means positioned to receive light energy coupled out of said waveguide loop; and whereby a differential frequency shift occurs in the spectral response of light energy resonating in said waveguide loop as a result of said stress-induced birefringence which is proportional to pressure acting on said diaphragm.

10. A pressure monitoring system according to claim 9, wherein said pressure responsive means includes a rim which is integrally formed with the perimeter of said diaphragm.

* * * * *